(12) United States Patent
Russke

(10) Patent No.: US 7,883,138 B2
(45) Date of Patent: Feb. 8, 2011

(54) CABRIOLET VEHICLE

(75) Inventor: Klaus Russke, Bissendorf (DE)

(73) Assignee: Wilhelm Karmann GmbH, Osnabruck (DE)

( * ) Notice: Subject to any disclaimer, the term of this patent is extended or adjusted under 35 U.S.C. 154(b) by 369 days.

(21) Appl. No.: 10/531,678

(22) PCT Filed: Oct. 13, 2003

(86) PCT No.: PCT/DE03/03399

§ 371 (c)(1),
(2), (4) Date: Dec. 1, 2005

(87) PCT Pub. No.: WO2004/037587

PCT Pub. Date: May 6, 2004

(65) Prior Publication Data

US 2006/0097543 A1    May 11, 2006

(30) Foreign Application Priority Data

Oct. 17, 2002    (DE) .............................. 102 48 350

(51) Int. Cl.
*B60J 7/00* (2006.01)
(52) U.S. Cl. .............................. 296/107.17; 296/107.07; 296/108
(58) Field of Classification Search ............ 296/107.07, 296/107.17, 108, 107.2, 216.01
See application file for complete search history.

(56) References Cited

U.S. PATENT DOCUMENTS 6,382,703 B1 *   5/2002   Queveau et al. ........ 296/107.17

FOREIGN PATENT DOCUMENTS

| DE | 44 45 580 | 12/1995 |
|----|-----------|---------|
| EP | 1 247 676 | 10/2002 |
| FR | 2 805 219 | 8/2001 |

* cited by examiner

*Primary Examiner*—Joseph D Pape
(74) *Attorney, Agent, or Firm*—Lucas & Mercanti, LLP; Klaus P. Stoffel

(57) ABSTRACT

A convertible includes an automobile body and a movable roof having at least a rear roof part and an upper roof part, wherein the rear roof part extends at least between a belt line and the upper roof part. The upper roof part is located above a passenger compartment and in front of the rear roof part. The rear roof part has a middle section that encloses a rear window and is located between lateral main posts of the automobile body when the roof is closed. The main posts and the middle section are each rotationally connected with the automobile body and with the upper roof part by joints which form a multijoint linkage whose axis of rotation lie in a common plane in at least one movement position of the roof, so that at least one additional support of the upper roof part located in front of the rear roof part is provided for supporting the upper roof part with respect to the automobile body, wherein the additional support is active in the at least one movement position of the roof.

13 Claims, 9 Drawing Sheets

CABRIOLET VEHICLE

BACKGROUND OF THE INVENTION

1. Field of the Invention

The invention concerns a convertible and a movable roof for the convertible.

2. Description of the Related Art

DE 44 45 580 C1 describes a convertible that has rigid roof parts that can be folded towards each other. A rear roof part comprises two main posts that project laterally upward and a rear window that lies between them. Following the course of the main posts, two parts of a linkage are installed on each side of the vehicle, one so-called link and one main link, which extend between a main bearing situated below the belt line and a front roof part, which, in its closed position, lies essentially horizontally above the passenger compartment. The link and the main link lie essentially parallel to each other in a side view and form parts of an articulated parallelogram, with which the opening and closing movement of the roof parts can be effected. The main link can also be formed by the main post of the rear roof part itself. In the lowered position of the roof, the links and the main posts are essentially horizontal, so that the rear window is located deep in the trunk and with its side that forms the outside surface when the roof is closed facing down. The curvature of the rear window further reduces the trunk space.

SUMMARY OF THE INVENTION

The invention is based on the problem of creating, in a convertible with several rigid roof parts, folding kinematics that are simple and optimized with respect to the trunk space when the roof is lowered.

The invention solves this problem with a convertible that includes at least two rigid roof parts, wherein a rear roof part extends at least between the belt line and a roof part, which is located above a passenger compartment and in front of the rear roof part, aid the rear roof part has a middle section that encloses a rear window and is located between lateral main posts when the roof is closed, characterized by the fact that the main posts, on the one hand, and the middle section, on the other hand, are each separately rotationally connected both with the automobile bad and with the upper roof part by joints, which form a multijoint linkage as seen in a side view, and whose axes of rotation lie in a common plane in at least one movement position of the roof, such that at least one additional support of the roof part or a roof part located in front of the rear roof part is provided for supporting the roof part with respect to the automobile body and is active in at least this movement position of the roof.

The invention makes it possible for the middle section that encloses the rear window to be lowered in a position separated from the main posts, so that the stowed dimensions of the lowered roof can be reduced. Even without an expensive rotational mechanism, the rear window can be lowered in the trunk or folding-top compartment in an elevated position relative to the lateral main posts, so that additional storage space is formed below it.

At the same time, the additional support, even in a so-called dead-center position, in which the pivot points of the joints lie one above the other in a line, necessarily prevents the front roof part or a front roof part from tilting down or flipping over towards the rear.

In this regard, the additional support is necessarily active only in this phase of the movement and therefore can have large tolerances.

Advantageously, it can also be active in other phases of the roof opening or closing, and in this regard, the parts that are involved in providing support during the movement can change repeatedly during the movement if there is sufficient elasticity of the parts and/or of their connections. This simplifies the requirements in the manufacture of the vehicles of the invention.

The outdoor feeling can be improved, even when the roof is closed, if a panel that acts as a sunroof is assigned to the upper roof part. This panel can be opened by moving it over the rear roof part. It is especially useful for the panel also to be transparent.

BRIEF DESCRIPTION OF THE DRAWING

Other advantages and features of the invention are apparent from specific embodiments of the object of the invention, which are illustrated in the drawings and described below.

FIG. 5 shows the roof in the closed position.

FIG. 6 shows the roof as it is starting to open.

FIG. 7 shows the roof after it has opened further in a dead-center position with joints lying in a line.

FIG. 8 shows a view similar to that of FIG. 7 after the opening of the roof has progressed further.

FIG. 9 shows the roof in its completely opened position.

DETAILED DESCRIPTION OF TEE INVENTION

Figure 1:
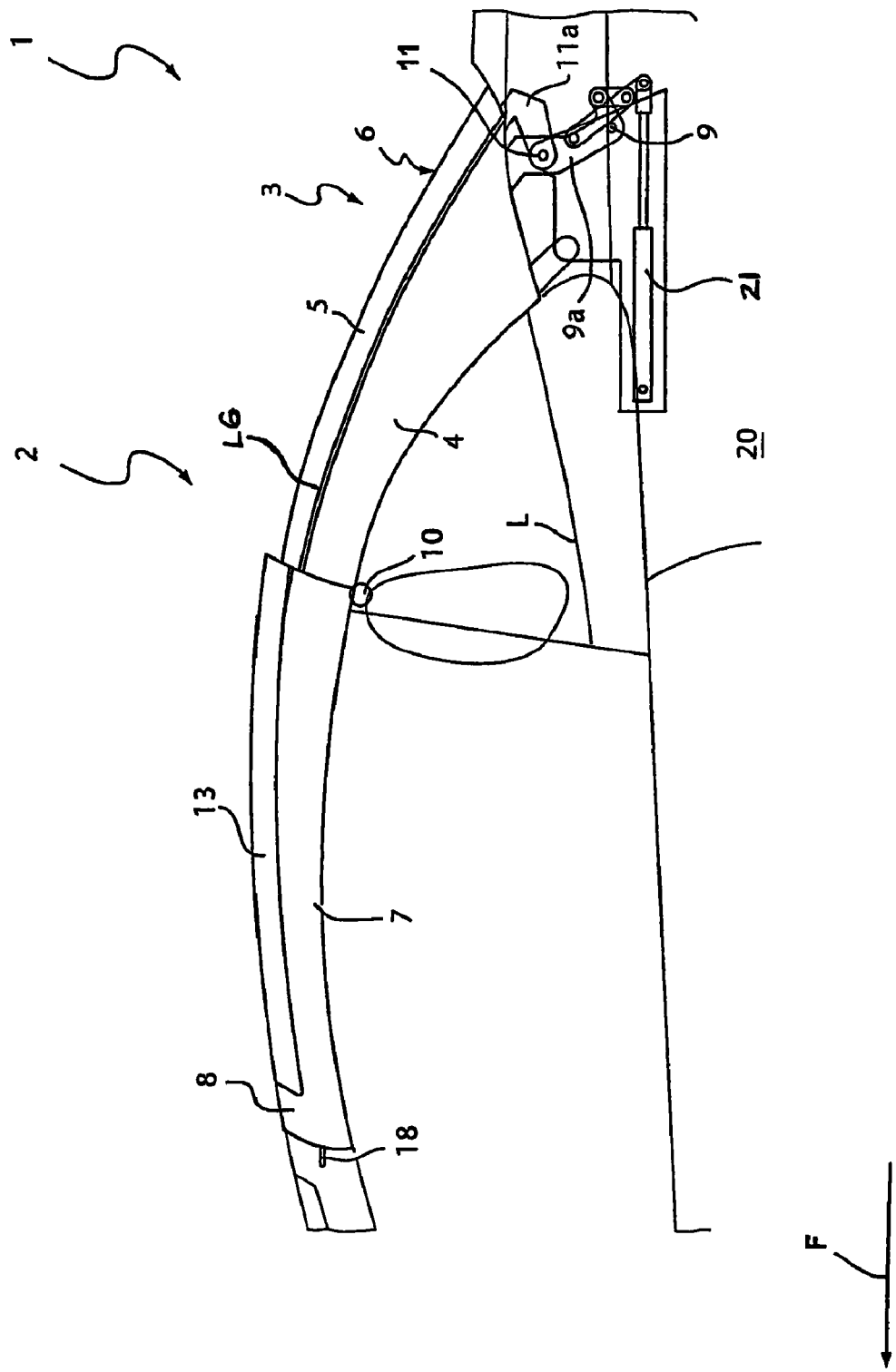
FIG. 1 shows a convertible of the invention in a schematic side view that is broken off below and at the front, with the roof completely closed.

The illustrated convertible 1 of the invention can be either a two-seater or a convertible with a larger interior and, say, two rows of seats arranged one behind the other.

The vehicle 1 comprises a movable roof, which is labeled as a whole by reference number 2 and has a rear roof part 3 with respect to the direction of travel F and two lateral main posts 4 and a middle section 5 situated between them. This middle section 5 encloses or consists essentially of a flexible or, especially, rigid rear window 6, which, for example, can be made of plastic or, advantageously, glass. Both the main posts 4 and the middle section 5 are rigid and therefore can transmit torques. The main posts 4 and a possible frame of the middle section 5 can be made of, for example, steel, a light metal, a metallic foam material, or plastic. It is also possible for the main posts 4 to be transparent. Moreover, the main posts 4 can be supported by frame parts.

In addition, the roof 2 comprises at least one upper roof part 7, which, in the closed state, is arranged in front of the rear roof part 3 in the direction of travel F of the vehicle. In the illustrated embodiment with a two-seat vehicle 1, this upper roof part 7 is continuously formed without any transverse division. In the closed state, it is essentially horizontal and is supported directly or indirectly on the windshield frame 8. Like the main posts 4, the upper roof part 7 can be made of various materials.

With the roof 2 closed (FIG. 1), the main posts 4 extend at least between the belt line L (they can also begin farther below in the automobile body 20) and the upper roof part 7, which is arranged towards the front in the direction of travel F and is located above a passenger compartment. The main posts 4 are supported in their lower region by arms 9a relative to the automobile body 20 on pivot joints 9, which are fixed with respect to the automobile body at least during the swiveling. Their joint axes run horizontally and transversely to the vehicle 1. In their upper region, the main posts 4 are connected with the upper roof part 7 on pivot joints 10, which also have horizontal joint axes that extend transversely to the vehicle 1. When the roof is being opened, the roof parts 3 and 7 fold towards each other about the axis of the pivot joints 10.

The lower region of the middle section 5 is supported by arms 11a relative to the automobile body 20 on one or more pivot joints 11, which are fixed with respect to the automobile body at least during the swiveling. Their axes run horizontally and transversely to the vehicle 1. In its upper region, the middle section 5 is connected with the upper roof part 7 on at least one pivot joint 12, which likewise has a horizontal bearing axis that extends transversely to the vehicle 1. In the present embodiment, two pivot joints 11, 12 are provided, which are assigned to both sides of the vehicle 1.

The lower pivot joints 11 of the middle section 5 each lie in a plane above the plane of the pivot joints 9 of the lateral main posts 4. The upper pivot joints 12 of the middle section 5 each lie in a plane above the plane of the pivot joints 10 of the main posts 4. As will be explained in greater detail below, the pivot bearings 9 and 11 can optionally be fixed with respect to the automobile body during the swiveling but can be displaced horizontally or almost horizontally between a closed roof position and an extreme rearward position suitable for swiveling.

The joints 9, 10, 11, 12 form a multijoint linkage as seen in a side view—in the illustrated embodiment, one four-bar linkage on each side of the vehicle. If the connecting lines between the joints 9, 10, on the one hand, and 11, 12, on the other hand, are respectively equally long, this results in an articulated parallelogram—drawn with broken lines in FIGS. 5 to 9—with the vertices 9, 10, 11, 12.

In addition to this multijoint linkage 9, 10, 11, 12, the front roof part 7 is provided with a separate support 25, which, when the roof is closed, is held visually concealed in a slot guide of the roof 2 and can support the roof part 7 with respect to the automobile body 20. It can be sufficient to provide a support 25 of this type on only one side of the vehicle. It is also possible to assign a support 25 to each side of the vehicle for reasons of symmetry. This support 25 is active at least in the so-called dead-center position shown in FIG. 7, in which all of the joints 9, 10, 11, 12 of the multijoint linkage lie on a line. Without the additional support 25, the front roof part 7 could tilt down out of this position in the direction of arrow 26, thereby moving the middle section 5 about the joints 11, 12 in the direction of arrows 27, 28, or the front roof part 7 could be moved upward in the direction of arrow 29, thereby moving the middle section 5 about the joints 11, 12 in the direction of arrows 30, 31. The support 25 has a double support function for the front roof part 7: it supports it both against the downward direction of arrow 26 and against the upward direction of arrow 29. Therefore, in this embodiment, the support 25 is designed as a rigid link. A Bowden cable, for example, would also be possible.

Alternatively, it would be possible to provide, say, a cable line with a return to prevent the front roof part 7 from tilting down under its own weight. The support effect against arrow 29 is less important inasmuch as the weight of the roof part 7 already opposes this movement.

The link 25 can possibly be held with some play in its upper joint 32 on the roof part 7 or in its lower joint 33 on the automobile body, since, unlike a guide rod for the pivoting movement of the roof 2, it does not have to have a guiding function but rather only a supporting function in the aforementioned dead-center position. Accordingly, for example, the upper joint 32 for the link 25 on the roof part 7 can be moved in a slotted link SL. Likewise, elastic play can also be present in the link 25 itself.

Figure 7:
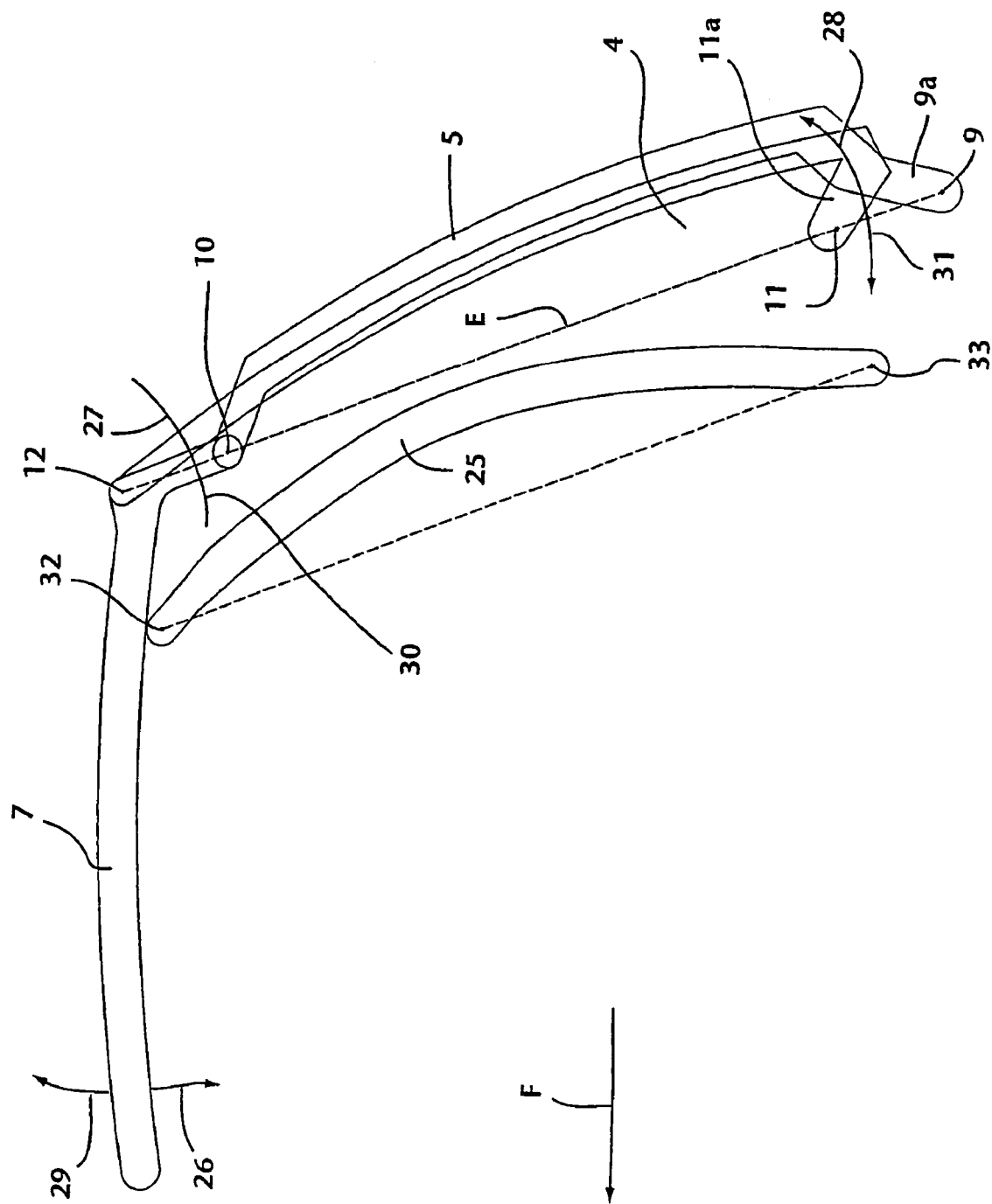
Figure 8:
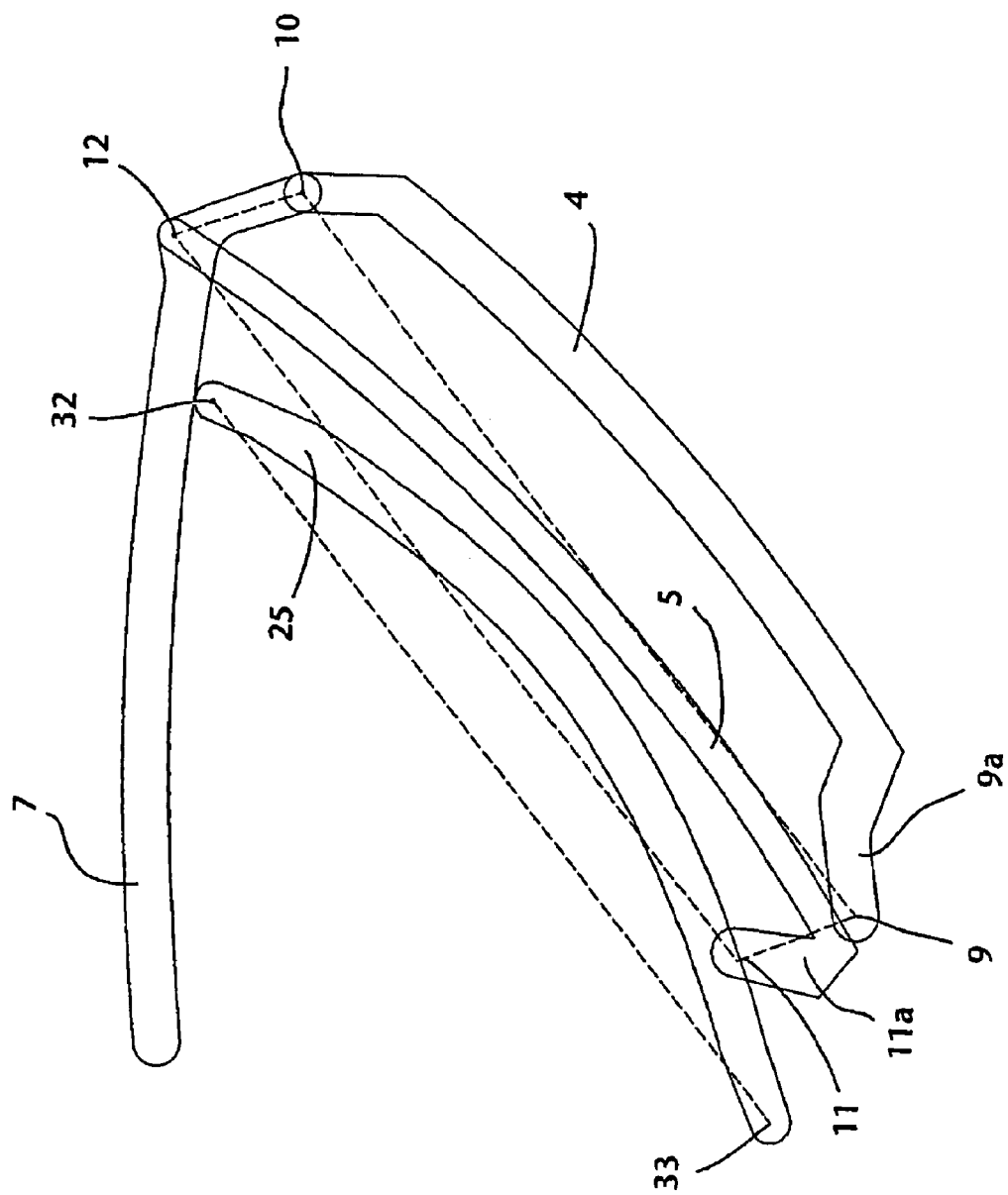

In FIG. 7, in the dead-center position, a four-bar linkage is formed by the joints 9, 10 of the main posts 4, on the one hand, and the joints 32, 33 of the support 25, on the other hand.

In a low-tolerance installation of the support 25, the support 25 can also serve as part of a multijoint linkage or an articulated parallelogram, at least during certain phases of the further opening or closing movement of the roof. Thus, for example, in FIG. 8 as well, a line of action of the multijoint linkage can lie between the joints 9, 10 of the main post 4, and another line of action can lie between the joints 32 and 33 of the support 25. Similarly, it is also possible for the first line of action to lie between the joints 9, 10 of the main post 4 and for another line of action to lie between the joints 11, 12 of the middle section 5.

Therefore, the activity of the support 25 can vary during the movement and is strictly essential only in the dead-center position (FIG. 7), in which the articulated parallelogram that consists of the joints 9, 10, 11, 12 is completely swiveled, and therefore all axes of these joints lie parallel to one another in a common plane. Therefore, during all the rest of the movement and in the terminal position of the roof 2, the support 25 may be nonessential, since the other two joints 32, 33 provide redundancy of the mechanism for the movement of the roof.

Another advantage of the kinematics in accordance with the invention is apparent from the fact that both with the roof closed (FIG. 5) and with the roof completely open (FIG. 9), the articulated parallelogram with the axes of the joints 9, 10, 11, 12 as the vertices is opened wide, so that the force required to move the roof from these terminal positions, especially the completely open position, is minimized, and favorable lever arms for the application of force by the drive mechanism 24 are obtained.

Figure 2:
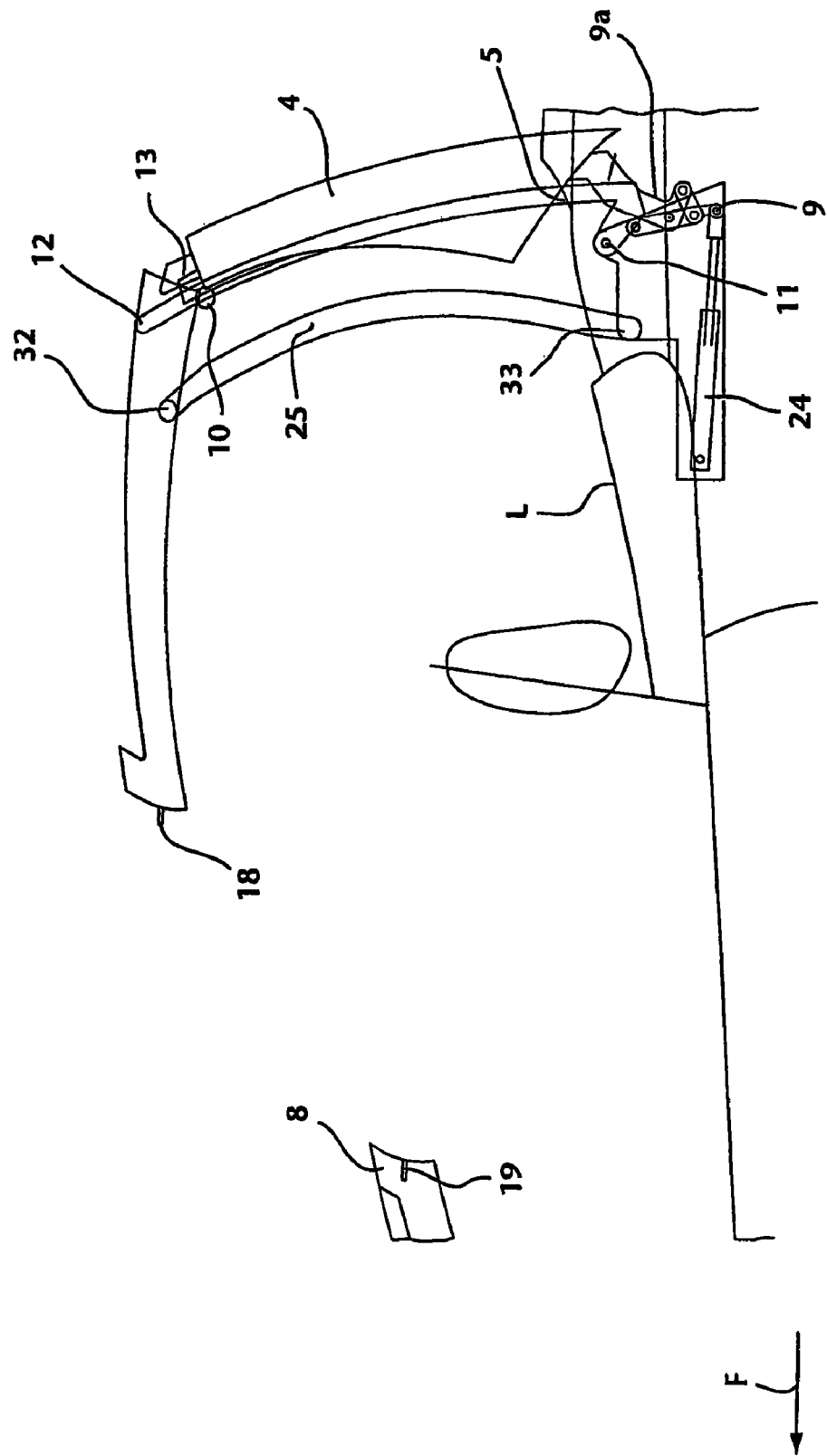
FIG. 2 shows a view similar to that of FIG. 1 at the beginning of roof opening, corresponding approximately to a dead-center position with joints lying in a line.

As a possible, but not essential, option, the front roof part 7 can additionally include a movable panel 13, which can be opened like a sunroof and moved over the rear roof part 3 (shown in FIG. 1 in the closed position and in FIG. 2 and subsequent figures in the open position, in which it has been moved over and parallel to the rear window 6 and is at least partially covered by the lateral main posts 4). The panel 13 consists of a transparent plastic or glass, so that even when it has been moved over the rear window 6, the view to the rear is not obstructed. It has lateral arms, which engage lateral guideways of the upper roof part 7 by means of bearing journals or similar guide elements. In addition, guide rails are provided on the middle section 5 of the rear roof part 3, which guide the panel 13 into a position parallel to the rear window 6 and can hold it there. In the closed position, the panel 13 engages both the guideways by means of the arms arranged in the front region and the rear guide rails by means of other arms (not shown). Therefore, the roof 2 cannot be opened until the sunroof 13 has been opened.

Even when the panel 13, which serves as a sunroof, has been moved to the rear by the maximum amount, it is still held in the guide rails of the rear roof part 3 and in the guideways of the upper roof part 7 by its arms. The end point of the guideways is in the pivot axis of the upper pivot joint 12, with which the middle section 5 engages the upper roof part 7, which makes it possible for the roof 2 to be opened and closed with the sunroof 13 open.

Alternatively, it would also be possible for the panel 13 to be held in its closed state only on the upper roof part 7 and in its open state to be transferred completely to the rear roof part 3. It would then be possible to open the roof with the sunroof 13 either completely open or completely closed.

The middle section 5 can consist of a support frame and a transparent panel mounted on it, which serves as the rear window 6. This panel can possibly support the guide rails for the sunroof 13. Many other designs are also possible, possibly also with a frame, in the middle of which the rear window is situated, or with arms welded directly onto a rear window.

To secure the front roof part 7 on the windshield frame 8, pins 18 are assigned to the roof part 7, which are located approximately in its extension plane and are directed in travel direction F in the closed state of the roof. The pins 18 fit into complementary recesses 19 of the windshield frame 8. The pins 18 and the recesses 19 can be conically shaped to facilitate centering of the closing roof 2. An additional securing mechanism is not absolutely necessary if a securing mechanism of the displaceable main bearing explained in the next paragraph is provided.

In the aforementioned optional design, the pivot bearings 9, 11 for the parts 4, 5 are fixed with respect to the automobile body and are mounted as a whole in a lateral main bearing, which can be displaced relative to the automobile body 20 horizontally or almost horizontally in the longitudinal direction of the vehicle. A drive mechanism, say, a hydraulic cylinder, a shaft, an electric motor or the like, is assigned to each of these main bearings 21. Each of the main bearings—and thus the roof 2 supported on them—can be moved by this drive mechanism horizontally between a front extreme position with the roof completely closed and a rear extreme position, in which the roof 2 has been displaced in the direction opposite the direction of travel to such an extent that the pins 18 have come out of the recesses 19 of the windshield frame 8. In this position, the roof 2 can pivot freely about the bearings 9, 11 of the main bearing without there being any danger of the tip of the roof colliding with the windshield frame 8.

The distance between the front and rear extreme positions of the drive mechanism 24 is limited to a few centimeters by a possibly adjustable rear stop in such a way that in the rear extreme position of the roof 2, the pins 18 are pulled out of the windshield frame 8 just far enough to allow swiveling to occur. Displacement too far to the rear, on the other hand, would unnecessarily delay the opening or closing operation.

One drive 24 for each side of the vehicle is sufficient for producing a uniform swiveling movement of the roof 2 about the bearings 9 and 11.

Figure 3:
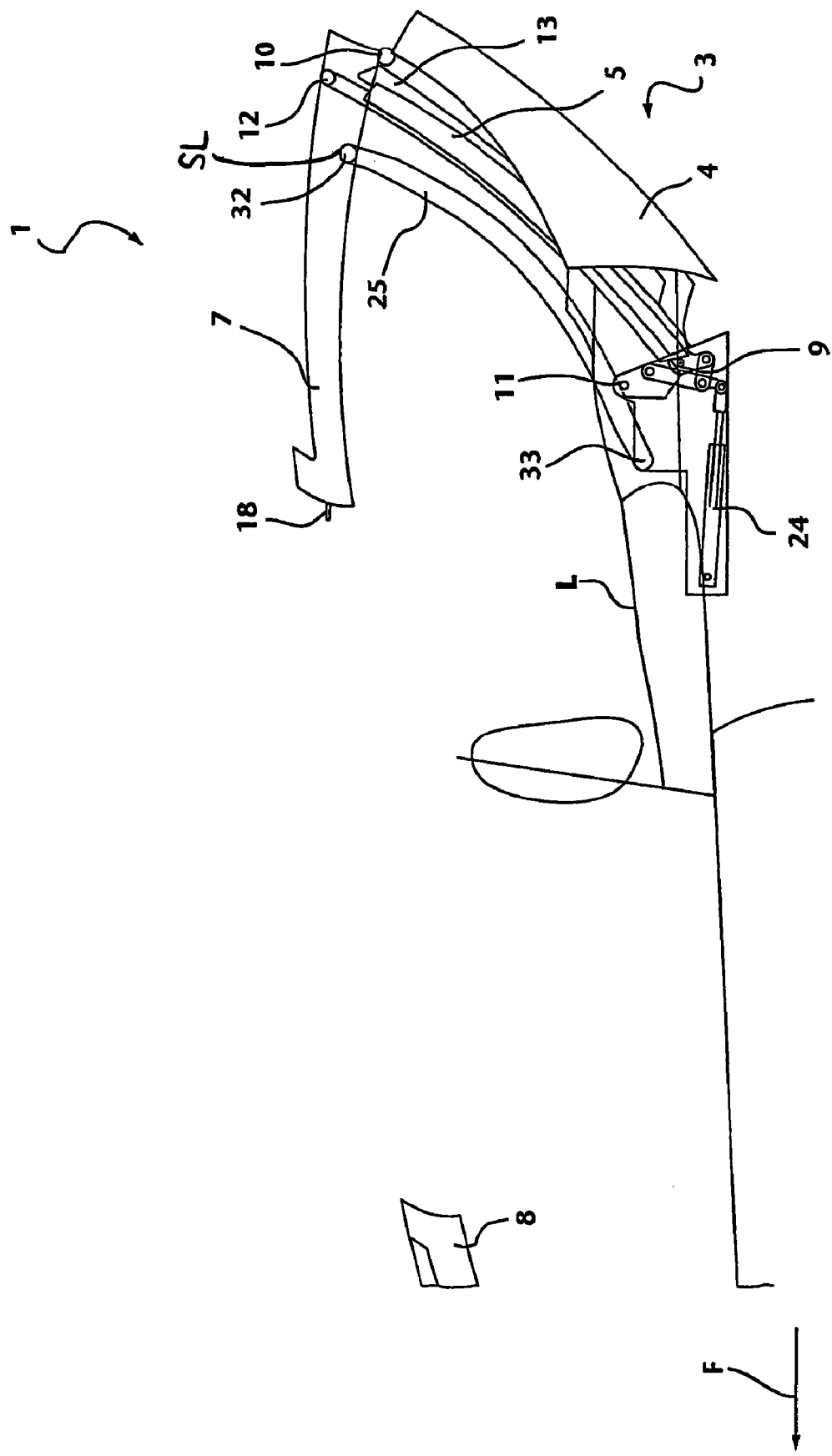
FIG. 3 shows a view similar to that of FIG. 2 with the roof opening progressing further.

To open the roof 2 from the closed position (FIG. 1) to a completely open position (FIG. 4)—without the option of the roof 2 that can be moved as a whole—the arms 9a are first swiveled by the force of the drive 24 towards the rear about the respective bearings 9, which are fixed with respect to the automobile body (FIG. 2, FIG. 3). In the example shown here, before the operation of opening the roof is started, the sunroof 13 is first opened by guiding the arms in the guideways and further guiding the panel 13 in the guide rails of the rear roof part 3 in such a way that in the completely open position of the sunroof, the bearing journals are coaxial with the pivot axis of the pivot joint 12. In this process, the bearing journals continue to be held in the guideways, so that they do not have to overcome either a step or a misalignment as the sunroof 13 is slid open. Since the middle section 5 and the roof part 7 swivel towards each other on the joint 12, during this swiveling, the panel 13 can be held motionless parallel to the rear window 6, which is part of the middle section 5, and yet remain with the arms in the guideways of the front roof part 7.

Figure 4:
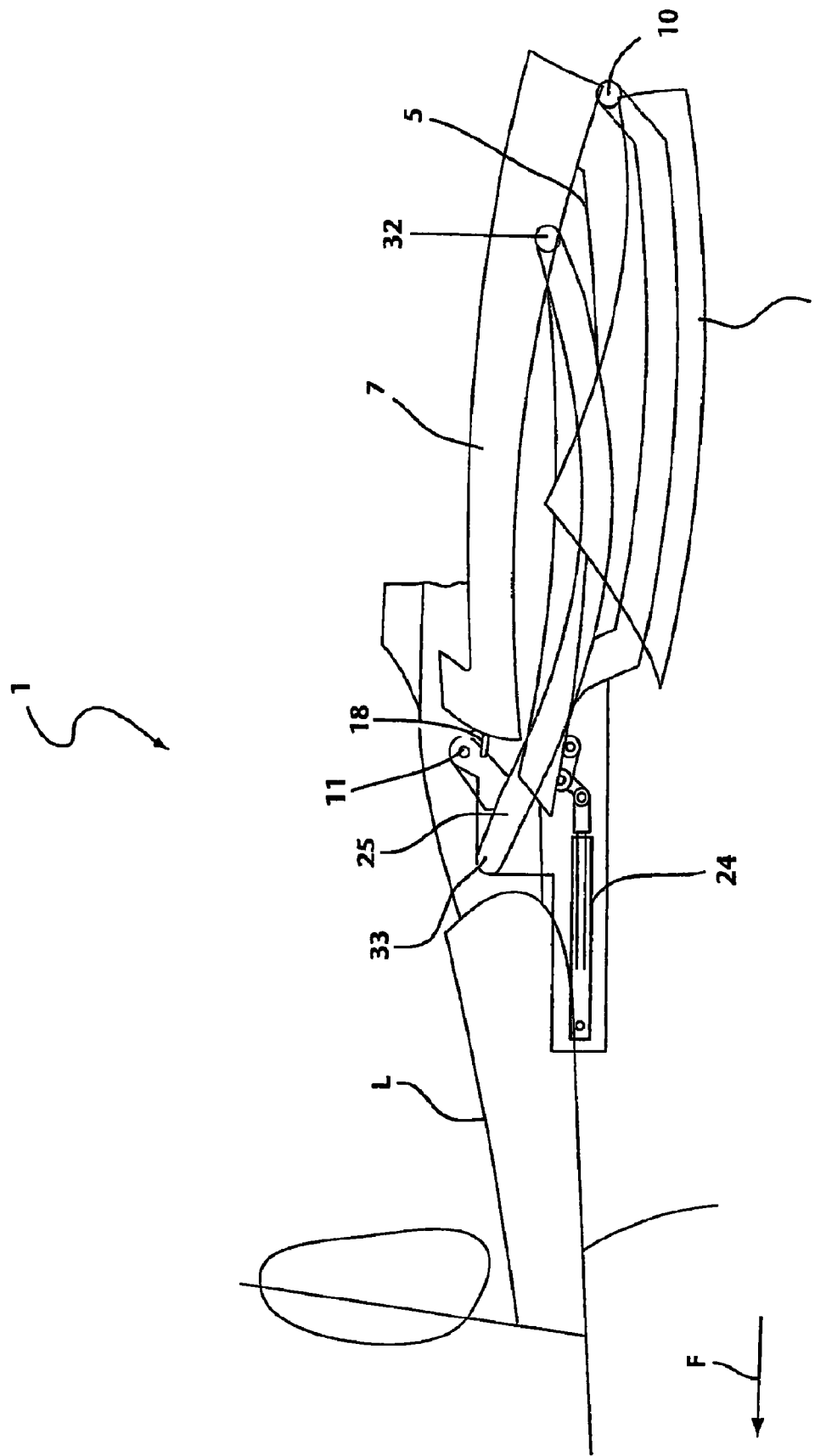
FIG. 4 shows a view similar to that of FIG. 3 with the roof it its completely opened position.
Figure 5:
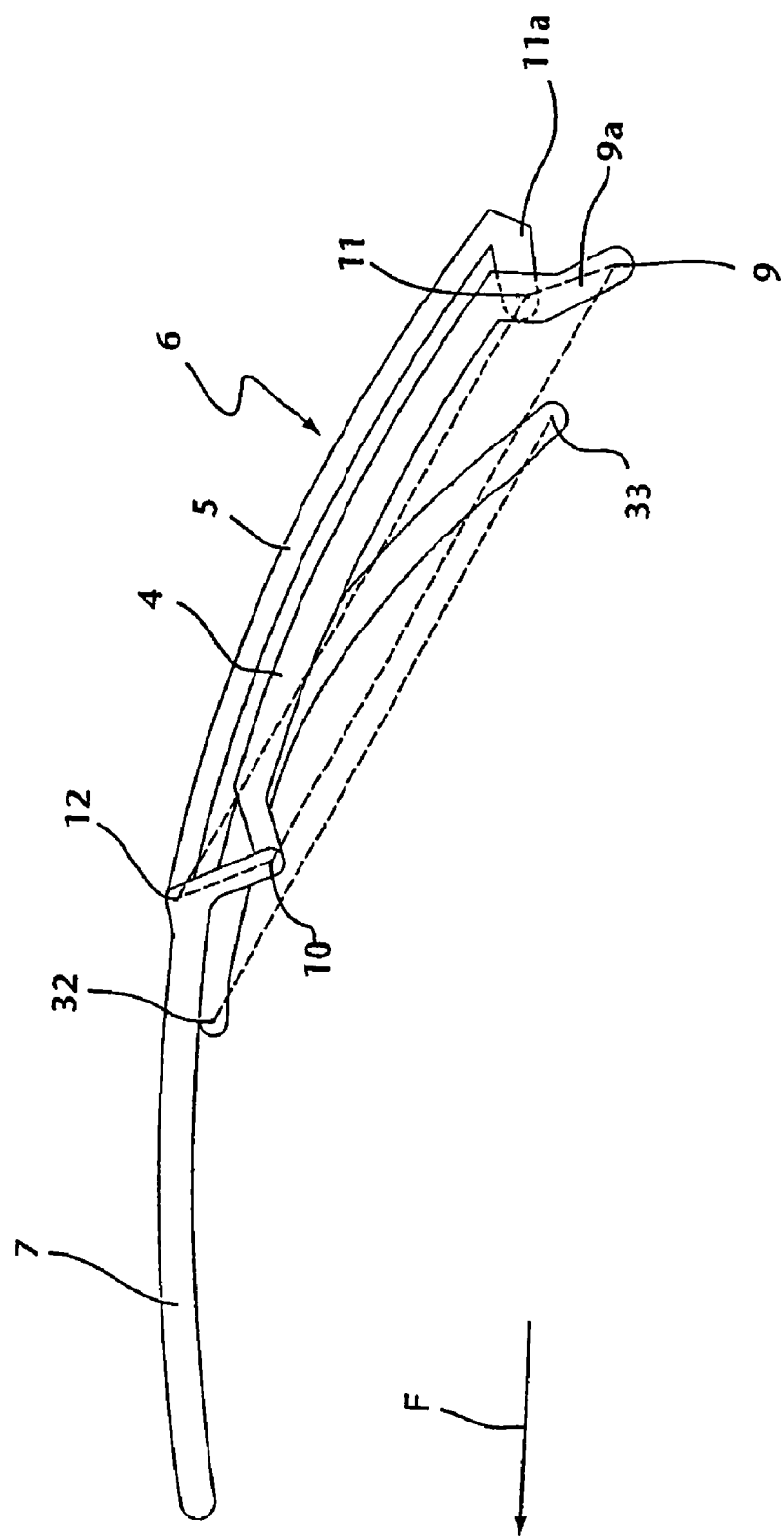
FIG. 5 to FIG. 9 show the sequence of movement of the opening of the roof with a schematic and simplified representation of the active multijoint linkage with lines of action drawn between the joints.
Figure 6:
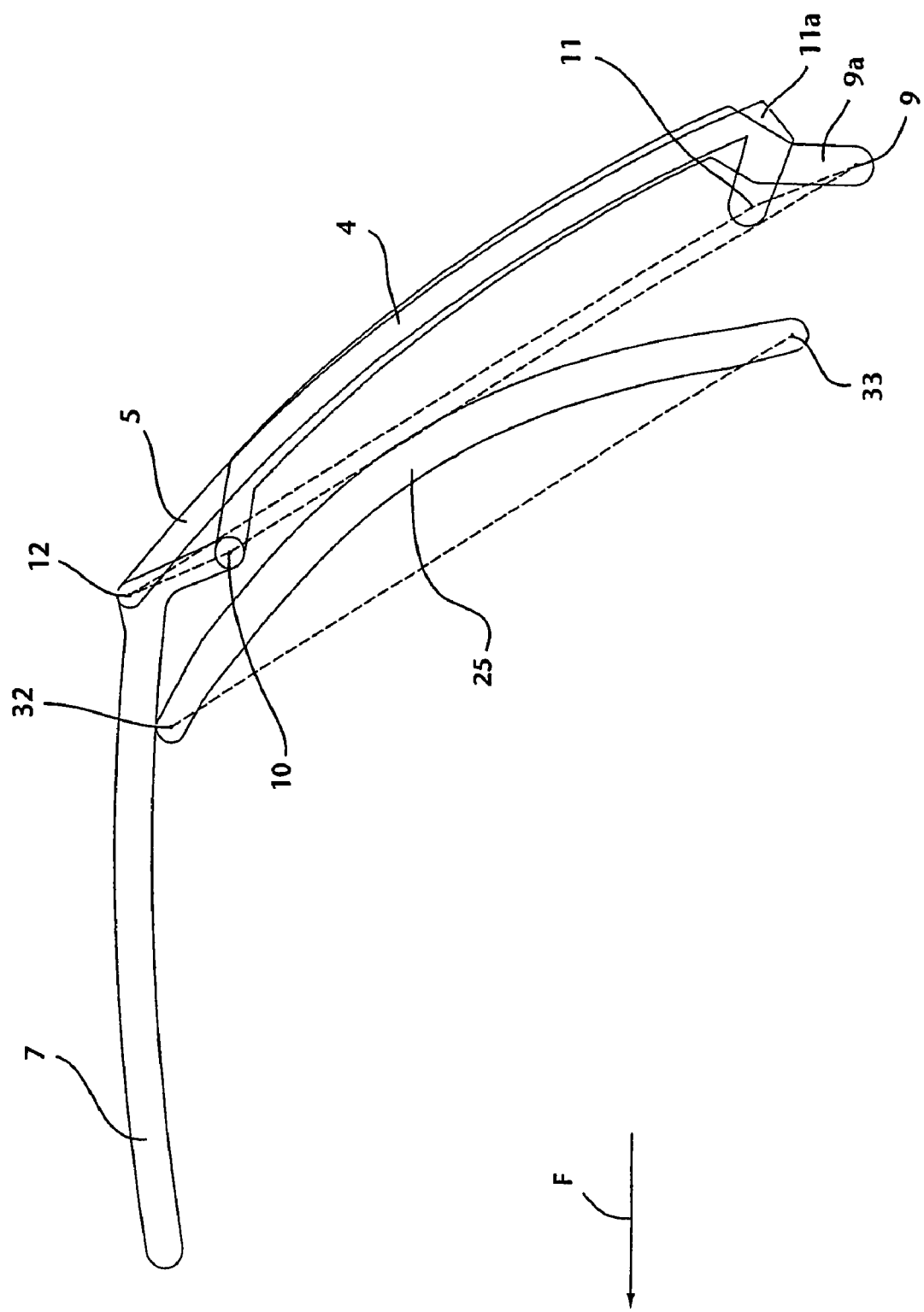
Figure 9:
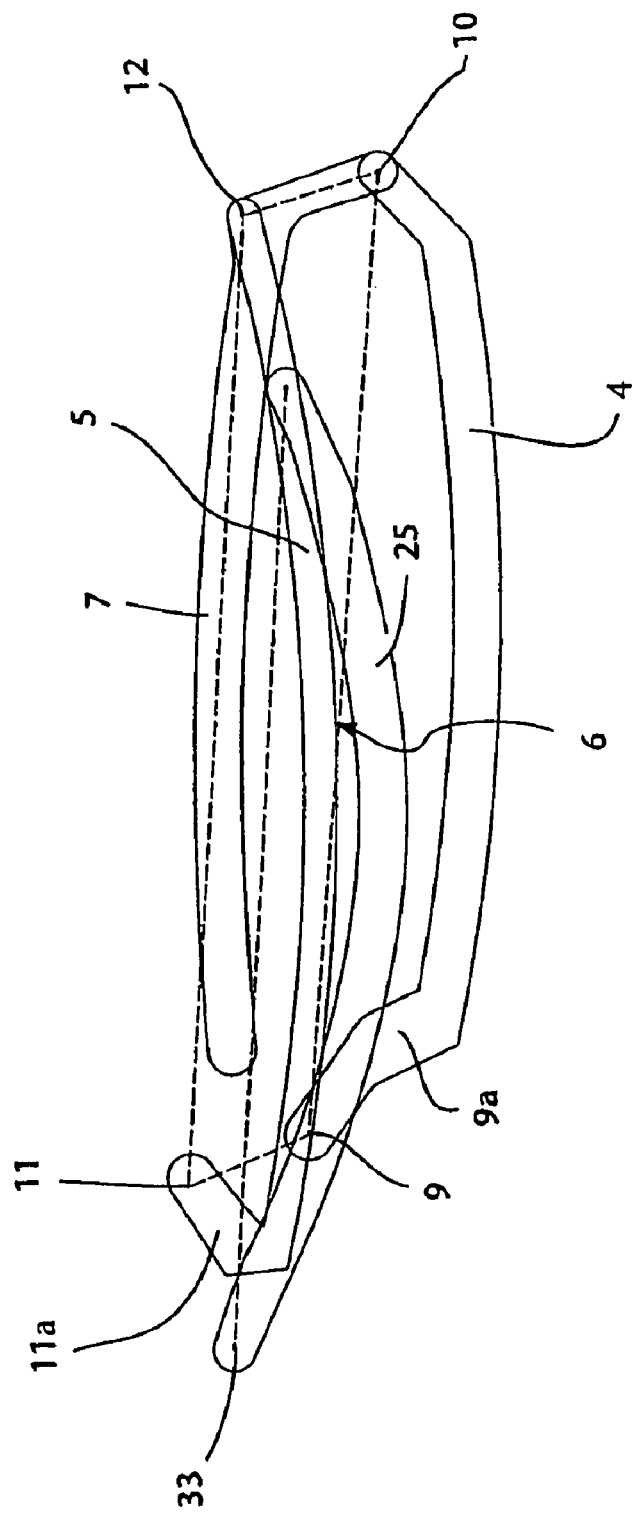

During the swiveling open of the roof parts 3 and 7, the middle section 5 passes through the extension plane of the main posts 4 due to the height shift of the planes of the joints 9 and 10, on the one hand, and 11 and 12, on the other hand. The long sides of the articulated parallelogram, formed by the main posts 4 and the middle section 5, completely fold towards each other, so that at the end, the parallelogram orientation has changed. In this way, the middle section 5 arrives in a lowered position in the automobile body 20 above the main posts 4 (FIG. 4, FIG. 9). This is very advantageous, because it results in additional storage space under the middle section 5 with the rear window 6.

With the option of a horizontal displacement of the whole roof 2, the roof 2 would first be moved towards the rear before the movement to swivel it open is initiated and can then be moved back towards the front after the roof has been completely opened.

The invention can be used both in vehicles with manually moved roofs and in vehicles with fully automatically or semi-automatically moved roofs 2.

The invention claimed is:

1. A convertible (1) comprising an automobile body and a movable roof (2) having at least a rear roof part (3) and an upper roof part (7), wherein the rear roof part (3) extends between a belt line (L) and the upper roof part (7), which is located above a passenger compartment and in front of the rear roof part (3), the rear roof part (3) having a middle section (5) that encloses a rear window (6) and being located between lateral main posts (4) when the roof is closed, wherein the main posts (4) and the middle section (5) are each rotationally connected both with the automobile body (20) and with the upper roof part (7) by joints (9, 10; 11, 12), which form a multijoint linkage whose axes of rotation lie in a common plane (E) in at least one movement position of the roof (2), such that au least one additional support (25) of the upper roof part (7) located in front of the rear roof part (3) is provided for supporting the roof upper part (7) with respect to the automobile body (20) wherein the additional support is active in that at least one movement position of the roof (2).

2. Convertible (1) in accordance with claim 1, wherein the multijoint linkage (9, 10; 11, 12) forms a four-bar linkage.

3. Convertible (1) in accordance with claim 1, wherein the main posts (4) and the middle section (5) constitute parts of an articulated parallelogram.

4. Convertible (1) in accordance with claim 1, wherein during part of roof opening or closing movements, the main posts (4) and the middle section (5) form a multijoint linkage (9, 10; 11, 12), and during part of the movement, the main posts (4) and the additional support (25) form a multijoint linkage (9, 10; 32, 33).

5. Convertible (1) in accordance with claim 4, wherein during part of the roof opening or closing movement, the main posts (4) and the middle section (5) form an articulated parallelogram, and during part of the movement, the main posts (4) and the additional support (25) form an articulated parallelogram.

6. Convertible in accordance with claim 1, wherein the additional support (25) supports the front root part (7) with respect to the automobile body (20).

7. Convertible in accordance with claim 1, wherein exactly one additional support (25) is installed on each side of the vehicle.

8. Convertible in accordance claim 1, wherein the support (25) or each support (25) is a link that is itself elastic or is elastic in at least one of its connections (32; 33).

9. Convertible in accordance with claim 1, wherein the articulation (11) of the middle section (5) on the automobile body (20) and the articulation (12) of the middle section (5) on the upper roof part (7) are each situated above planes of the respective articulations (9; 10) of the main post (4).

10. Convertible in accordance with claim 9, wherein in an open state of the roof (2), the rear window (6) is held above the main posts (4).

11. Convertible in accordance with claim 1, wherein the middle section (5) is formed as a rear window (6) essentially over its entire height.

12. Convertible in accordance with claim 1, wherein a panel (13) mounted on the upper roof part (7) is supported in lateral guide; (LG) so as to be movable longitudinally.

13. A movable vehicle roof (2) for a convertible (1) comprising at least a rear roof part (3) and an upper roof part (7) wherein the rear roof part (3) extends at least between a belt line (L) and the upper roof part (7), which is located above a passenger compartment and in front of the rear roof part (3), the rear roof part (3) having a middle section (5) that encloses a rear window (6) and being located between lateral main posts (4) when the roof is closed, wherein the main posts and the middle section (5) are each rotationally connected both with the automobile body (20) and with the upper roof part (7) by joints (9, 10; 11, 12), which form a multijoint linkage whose axes of rotation lie in a common plane (E) in at least one movement position of the roof (2), such that at least one additional support (25) of the upper roof part (7) located in front of the rear roof part (3) is provided for supporting the roof upper part (7) with respect to the automobile body (20) wherein the additional support is active in that at least one movement position of the roof (2).

* * * * *